Aug. 4, 1931.    G. ROBINSON ET AL    1,817,100
LIGHT PROJECTING AND DISPERSING DEVICE
Filed Jan. 13, 1930    2 Sheets-Sheet 1

Inventors
George Robinson,
Florence A. Kmieske,
Lewis A. Kmieske.
By A. J. O'Brien
Attorney

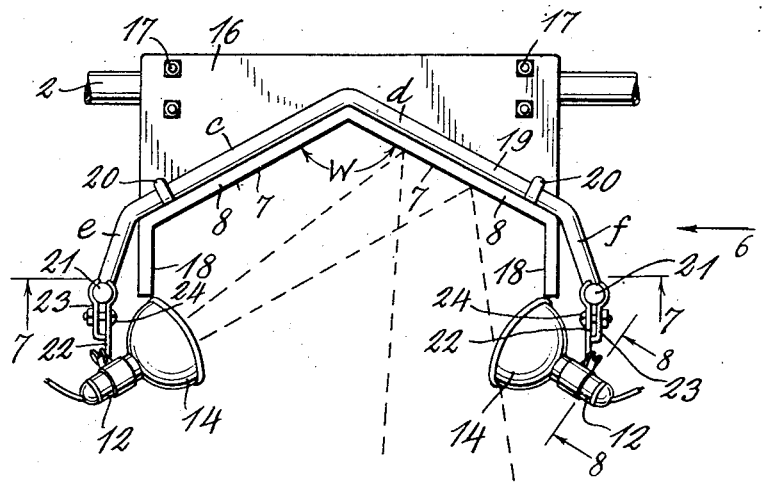
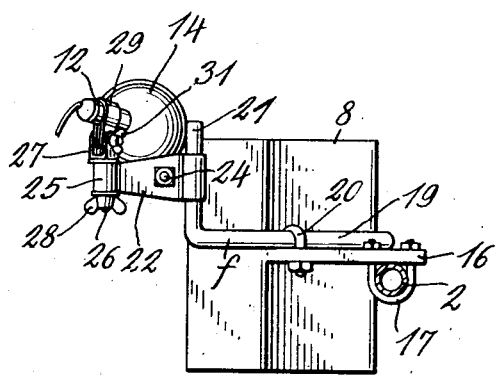
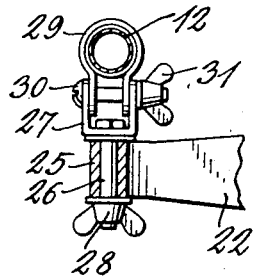
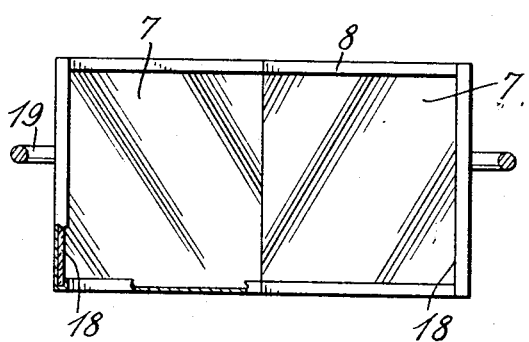

Patented Aug. 4, 1931

1,817,100

UNITED STATES PATENT OFFICE

GEORGE ROBINSON, FLORENCE A. KMIESKE, AND LEWIS A. KMIESKE, OF LITTLETON, COLORADO

LIGHT PROJECTING AND DISPERSING DEVICE

Application filed January 13, 1930. Serial No. 420,359.

This invention relates to improvements in light projecting and dispersing devices and has reference more particularly to improvements in headlights of the type employed in connection with automobiles.

It is well known that the headlights that are in use on automobiles are highly objectionable for the reason that they project powerful beams of light upwardly in such a direction that they strike the eyes of approaching drivers and of pedestrians with the result that they become temporarily blinded and it has often happened that serious accidents have occurred from this cause.

It is an object of this invention to produce a light projecting and dispersing device that can be applied to an automobile in addition to the present headlights or which can be embodied in the present headlight construction in such a manner that the present objectionable glare will be overcome and good illumination of the road produced.

This invention briefly described consists in substituting for the ordinary parabolic reflectors two plain mirrors or reflecting surfaces that intersect each other and are angularly spaced so as to form an angle that is greater than ninety degrees and less than one hundred eighty degrees. An incandescent lamp is secured to the frame work that supports the mirrors and is located one at the outer end of each mirror and near the top of the mirror. These lamps are provided with reflectors and are so adjusted that they direct a beam of light downwardly onto the surface of the mirror that is located opposite to the light. This beam is then reflected downwardly and outwardly and strikes the road at a proper distance in front of the automobile to produce the best results for night driving. The lamps and the reflectors are also so arranged that light will pass directly from the lamps onto the road directly in front of the machine and so that some of this light will also strike the front of the automobile so as to produce what may be termed a flood lighting effect.

The arrangement of lights and mirrors just described can be located within the ordinary headlight housings or can be formed with a separate assembly that is located between the headlights in a manner which will be hereinafter more fully described.

Having thus briefly described the invention, the same will now be described in detail and for this purpose reference will be had to the accompanying drawings in which the preferred embodiment thereof has been illustrated and in which:

Fig. 5 is a top plan view of the light projecting and dispersing device that is located between the headlights;

Fig. 6 is a view looking in the direction of arrow 6, Fig. 5;

Fig. 7 is a section taken on line 7—7, Fig. 5; and

Fig. 8 is a section taken on line 8—8, Fig. 5.

Figure 3:
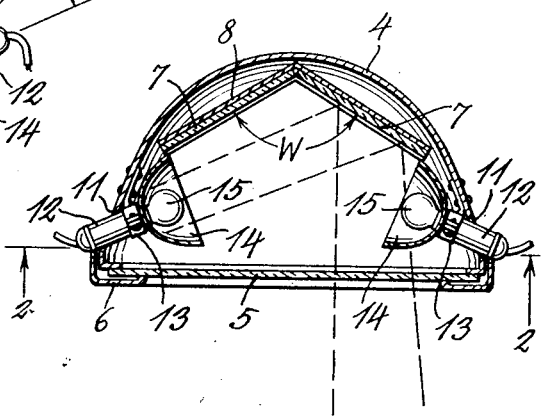
Fig. 3 is a section taken on line 3—3, Fig. 2.
Figure 4:
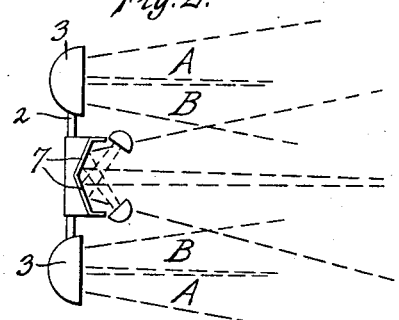
Fig. 4 is a diagram showing the distribution of the light from the headlights and from the central projecting and dispersing device.

In the drawings reference numerals 1 indicate the front of the two front fenders of an automobile and numeral 2 indicates the tie rod on which the headlights 3 are supported. The headlights which form the subject of this invention each comprise a housing 4 which may be of the ordinary size and shape and which is provided at its front end with a lens 5 that is held in place by a lens retaining rim 6. The ordinary parabolic reflector has been replaced by means of two flat mirrors 7. These mirrors intersect each other along line 8' which is substantially vertical when the headlight is in place. The angle $w$ between the two reflecting surfaces of the mirrors must be greater than ninety degrees and less than one hundred eighty degrees, but can be varied within comparatively wide limits, depending on the dispersion of light that is desired. The mirrors are preferably secured in metal frames 8 that are provided with lugs or ears 9 which are perforated for the reception of screws 10 by means of which the frames are secured to the housing. The housing is preferably provided with two openings 11 located on opposite sides of the vertical diameter and above the upper edge of the mirror. Lamp sockets 12 of usual construction extend through openings 11 and are secured to the housing by clamping devices 13. Reflectors 14 are secured to the inner ends of the sockets and enclose incandescent lamps 15. The optical axes of the reflectors are inclined downwardly and transversely of the headlights so as to strike the mirrors on the opposite side of the vertical diameter substantially at their central points. When the lamps are illuminated, the beams of light that are projected will strike the mirrors substantially as shown in Fig. 3 and will be reflected in a downward and outward direction. Since there are two sources of light and two mirrors, each headlight will throw two beams of light forwardly and by properly adjusting the angle between the mirrors the two beams can be so arranged that they will supplement each other in the manner shown in Fig. 4 where one of the beams has been designated by letter A and the other by letter B. As the reflecting surfaces are preferably planes, there will be no upward reflection of the light and therefore there will be no stray beams of light passing upwardly to such a height that they will interfere with approaching traffic. It is apparent that by adjusting the angular position of the mirrors and of the reflectors 14, different effects can be produced. In the embodiment illustrated in connection with the headlights, no means have been provided for adjusting the angular relation of the sockets 12 as it is the intention to have these fixed in a position that is found to be most desirable, as there is no need of adjustment except for the purpose of producing the best results and this can best be determined by careful experimentation and the headlights are then built so as to conform with the results obtained by such experiment.

Figure 1:
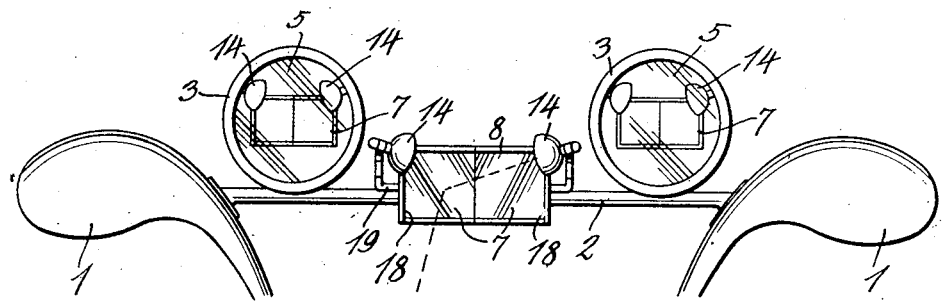
Fig. 1 is a front elevation showing a portion of an automobile with the improved headlights in place thereon.
Figure 2:
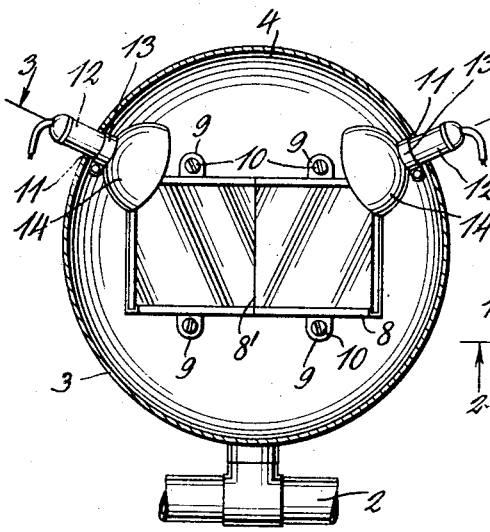
Fig. 2 is a section through one of the headlights, taken on line 2—2, Fig. 3.

Instead of building the reflecting and dispersing device within a headlight housing, it can be attached to a separate frame and supported from the bar 2 at a point between the two headlights. This embodiment of the invention has been illustrated in Figs. 5 to 8, in which the frames 8 that support the mirrors 7 have been shown as provided with a rearwardly extending flange 16. This flange is adapted to be supported on the bar 2 and is held in place thereon by means of two U-bolts 17. In addition to the two mirrors 7 that have been shown and described in connection with the headlights two additional mirrors numbered 18 are provided. These mirrors extend parallel with the bisector of the angle between mirrors 7 in the manner shown in Fig. 5. For the purpose of supporting the lamp sockets 12, and the reflectors 14, adjustable supporting brackets have been provided and these in turn are held in position by means of a frame member 19. Member 19 is preferably made from a round bar and has two angularly related portions c and d that fit against the rear surfaces of the mirror frames and are secured to the flange 16 by means of U-bolt 20. From the outer ends of portions c and d, straight portions e and f extend forwardly and terminate in upwardly extending arms 21. Clamps comprising members 22 and 23 are secured to the vertical ends 21 and held in place thereon by means of bolts 24. The outer end of member 22 is provided with a cylindrical portion 25 that has an opening for the reception of the clamping bolt 26. A U-shaped member 27 is secured to the upper surface of the cylindrical part 25 and held in place by means of a bolt 26, the latter being provided with a butterfly nut 28. A strap or clamping member 29 encircles the socket and has downwardly extending arms that are located between the vertical arms of the U-shaped member. A clamping bolt 30 that is provided with a butterfly nut 31, extends through the overlapping portions of members 27 and 29 and serve to hold these two members in adjusted position. It is apparent that the sockets 12 with their reflectors 14 can be adjusted about the axes of the vertical members 21 and also about the axes of bolts 26 and 30, and it is therefore possible to obtain any adjustment desired of the lamps and reflectors with respect to the mirrors 7. The auxiliary light projecting and dispersing device shown in Figs. 5 to 8 can be applied to any automobile and supported in substantially the position shown in Fig. 1, and can be used by itself or in conjunction with the ordinary headlights. The auxiliary device is especially well adapted for use with ordinary headlights as it is possible to obtain good illumination of the road when the headlights are dim and therefore all objectionable glare is avoided while good illumination is obtained.

Where the improved headlights shown in Figs. 1 to 3 are employed, the auxiliary device is not necessary as the headlights can always be used full strength and therefore good road illumination is obtained by them alone.

From the above description it will be apparent that the device described above and illustrated on the drawings is especially well adapted for use on automobiles as it gives good road illumination without objectionable glare. Although the device is especially designed for use with automobiles and other vehicles, it is also suited for many other uses where a glareless illumination is desired.

Having described the invention what is claimed as new is:

1. A headlight for automobiles or the like comprising two flat reflecting surfaces that intersect each other in a substantially vertical straight line and which lie in planes separated by an angle greater than ninety degrees and less than one hundred eighty degrees and separate means for directing light onto each of the reflecting surfaces from lamps located on the other side of the line of intersection of the reflecting surfaces, said lamps being located at the outer ends of the reflecting surfaces and above a horizontal plane bisecting the vertical line of intersection.

2. A light projecting and dispersing device comprising, in combination, two substantially flat reflectors lying in planes that intersect each other at an angle less than one hundred eighty degrees and greater than ninety degrees, a lamp located near the outer and upper corner of each reflector, and a paraboloidal reflector enclosing each lamp, the optical axes of the last mentioned reflectors being inclined downwardly and onto the reflecting surface of the flat reflector on the other side of the line of intersection whereby the light will be reflected outwardly and downwardly.

3. A light projecting and dispersing device comprising, in combination, two plane mirrors so located that the planes of their reflecting surfaces intersect each other and form an angle with each other of over ninety and less than one hundred and eighty degrees, a source light located near the top and at the outer end of each mirror, and means for producing a concentrated beam of light from each source and for directing it onto the other mirror whereby it will be reflected in a forward and a downward direction.

In testimony whereof we affix our signatures.

GEORGE ROBINSON.
FLORENCE A. KMIESKE.
LEWIS A. KMIESKE.